(12) United States Patent
Patel

(10) Patent No.: US 9,329,755 B2
(45) Date of Patent: May 3, 2016

(54) MOBILE DEVICE TOOLBAR ARCHITECTURE

(71) Applicant: Opera Software Ireland Limited, Dublin (IE)

(72) Inventor: Ronakkumar Patel, Santa Clara, CA (US)

(73) Assignee: Opera Software Ireland Limited, Dublin (IE)

(*) Notice: Subject to any disclaimer, the term of this patent is extended or adjusted under 35 U.S.C. 154(b) by 19 days.

(21) Appl. No.: 13/969,445

(22) Filed: Aug. 16, 2013

(65) Prior Publication Data

US 2014/0053107 A1 Feb. 20, 2014

Related U.S. Application Data

(60) Provisional application No. 61/683,717, filed on Aug. 16, 2012, provisional application No. 61/715,260, filed on Oct. 17, 2012.

(51) Int. Cl.

| G06F 3/0481 | (2013.01) |
|---|---|
| G06F 3/0482 | (2013.01) |
| G06F 9/44 | (2006.01) |
| G06Q 30/02 | (2012.01) |

(52) U.S. Cl.
CPC .......... *G06F 3/0482* (2013.01); *G06Q 30/0251* (2013.01); *G06F 3/0481* (2013.01); *G06F 3/04812* (2013.01); *G06F 9/4443* (2013.01)

(58) Field of Classification Search
CPC . G06F 3/0481; G06F 3/04812; G06F 3/0482; G06F 9/4443

USPC ........ 715/744, 747, 760, 764, 810, 840, 864; 705/14.4, 14.49, 14.53, 14.55, 14.59, 705/14.73; 709/203, 205, 206; 726/10
See application file for complete search history.

(56) References Cited

U.S. PATENT DOCUMENTS

| 6,216,112 | B1 * | 4/2001 | Fuller et al. ................. 705/14.19 |
| 6,232,972 | B1 * | 5/2001 | Arcuri et al. ................... 715/815 |
| 6,624,831 | B1 * | 9/2003 | Shahine et al. ................ 715/815 |
| 6,704,031 | B1 * | 3/2004 | Kimball et al. ............... 715/745 |
| 6,784,900 | B1 * | 8/2004 | Dobronsky et al. ........... 715/744 |
| 6,957,390 | B2 * | 10/2005 | Tamir et al. .................... 715/744 |
| 7,076,469 | B2 * | 7/2006 | Schreiber et al. ............... 705/57 |
| 7,107,548 | B2 * | 9/2006 | Shafron ........................ 715/826 |
| 7,185,333 | B1 * | 2/2007 | Shafron ........................ 717/173 |

(Continued)

OTHER PUBLICATIONS

PCT International Search Report, PCT Application No. PCT/US13/55460, Mar. 4, 2014, 20 pages.

*Primary Examiner* — Eric J Bycer
(74) *Attorney, Agent, or Firm* — Fenwick & West LLP

(57) ABSTRACT

A toolbar is integrated within an application or provided as a standalone component that interfaces with an existing application. The toolbar detects events corresponding to the application and generates a toolbar display corresponding to the event. On loading of a particular webpage in a browser, the toolbar may generate a toolbar display comprising a set of functions to be made available to the user for that webpage. The toolbar may generate different displays for different webpages and different events such as a page load event or a tab change event. Additionally, when provided as a standalone component, the toolbar may generate different displays for different applications. User experience at the toolbar may be controlled through a remote server without extensive modification of the application.

25 Claims, 7 Drawing Sheets

(56) References Cited

U.S. PATENT DOCUMENTS

| | | | |
|---|---|---|---|
| 7,412,655 B2* | 8/2008 | Wada et al. | 715/744 |
| 7,502,994 B2* | 3/2009 | Kocol | 715/205 |
| 7,506,260 B2* | 3/2009 | Wada et al. | 715/738 |
| 7,676,762 B2* | 3/2010 | Shafron | 715/826 |
| 8,046,403 B2* | 10/2011 | Mazzaferri | 709/202 |
| 8,275,863 B2* | 9/2012 | Selgas et al. | 709/221 |
| 8,479,113 B2* | 7/2013 | Fujioka et al. | 715/779 |
| 2003/0080995 A1* | 5/2003 | Tenenbaum et al. | 345/738 |
| 2003/0101092 A1* | 5/2003 | Fuller et al. | 705/14 |
| 2003/0184582 A1* | 10/2003 | Cohen | 345/736 |
| 2003/0233482 A1* | 12/2003 | Skrepetos | 709/250 |
| 2004/0061720 A1* | 4/2004 | Weber | 345/760 |
| 2005/0033728 A1 | 2/2005 | James et al. | |
| 2005/0044504 A1* | 2/2005 | Fernandez et al. | 715/762 |
| 2005/0060655 A1* | 3/2005 | Gray et al. | 715/745 |
| 2005/0259120 A1* | 11/2005 | Mansfield et al. | 345/661 |
| 2006/0156283 A1* | 7/2006 | Landau et al. | 717/114 |
| 2006/0224967 A1* | 10/2006 | Marmaros | 715/738 |
| 2008/0155425 A1* | 6/2008 | Murthy et al. | 715/738 |
| 2008/0276164 A1* | 11/2008 | Bamford | 715/238 |
| 2008/0297662 A1* | 12/2008 | Gibbs | 348/725 |
| 2009/0006213 A1* | 1/2009 | Lerman et al. | 705/14 |
| 2009/0070405 A1* | 3/2009 | Mazzaferri | 709/202 |
| 2009/0083646 A1* | 3/2009 | Lin et al. | 715/769 |
| 2009/0228820 A1 | 9/2009 | Kim et al. | |
| 2010/0122157 A1* | 5/2010 | Cepero Gonzalez | 715/239 |
| 2010/0162165 A1* | 6/2010 | Addala | G06F 3/04886 715/810 |
| 2010/0223664 A1* | 9/2010 | Naranjo et al. | 726/10 |
| 2010/0257059 A1* | 10/2010 | Fujioka et al. | 705/14.66 |
| 2011/0173534 A1* | 7/2011 | Huang et al. | 715/702 |
| 2011/0320277 A1 | 12/2011 | Isaacs | |
| 2012/0137221 A1* | 5/2012 | Bhandari et al. | 715/719 |

* cited by examiner

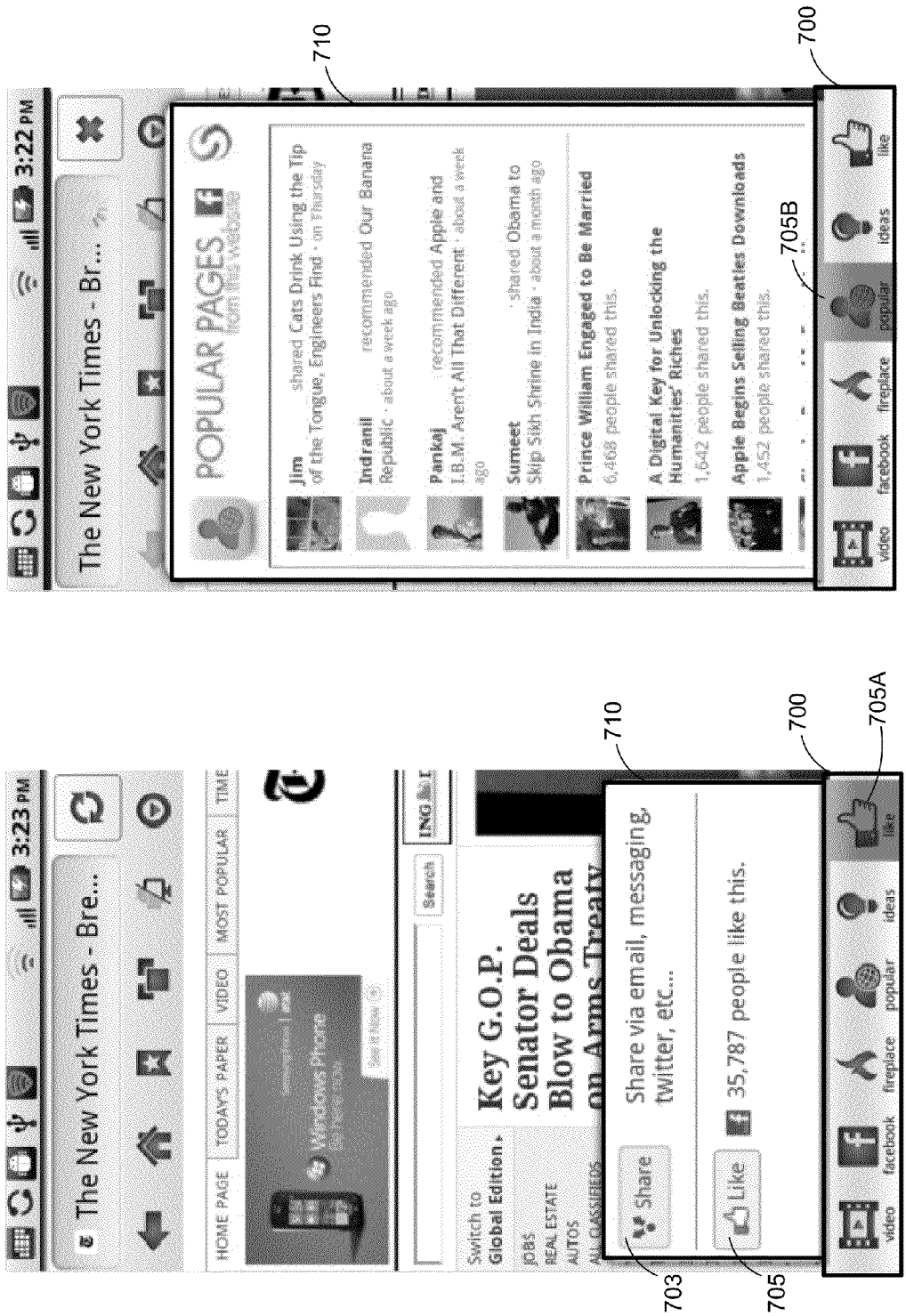

MOBILE DEVICE TOOLBAR ARCHITECTURE

CROSS REFERENCE TO RELATED APPLICATIONS

This application claims the benefit of U.S. Provisional Application No. 61/683,717 and U.S. Provisional Application No. 61/715,260, which are both incorporated by reference herein in their entirety.

BACKGROUND

1. Field of Art

The disclosure generally relates to providing an adaptable toolbar for targeting advertisements and providing user functionality on a mobile device.

2. Description of the Related Art

Traditional toolbars installed to traditional desktop browsers extend the functionality of the browser. These traditional toolbars typically provide a persistent and static interface to the user within the browser. The more functionality the user desires, the more toolbars the user may install at the expense of browsing area on the desktop browser. Mobile devices, such as smart phones and tablets, have become prevalent in recent years. Given the advances in mobile computing power and far-reaching wireless Internet access, more and more users view online content through browsers and other applications on their mobile devices. On a mobile device with limited screen real-estate, this traditional method of extending the functionality of the browser degrades user experience.

Additionally, a mobile service provider, or carrier, may desire to control some aspects of the user experience on mobile devices operating on their network. Traditional methods of controlling user experience have frequently degraded user experience overall and caused difficulties in updating device software. In a specific example, a carrier may "brand" a third party operating system or application of a mobile device for use on the network. In turn, when the third party updates their software, the carrier itself may need to approve and distribute branded versions of software updates to the mobile device before users can access them. Not only does branding require development resources at the carrier, but can frustrate users desiring the updated version of the software.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 7A and 7B illustrate example toolbar displays generated on a mobile device.

DETAILED DESCRIPTION

Figure 1:
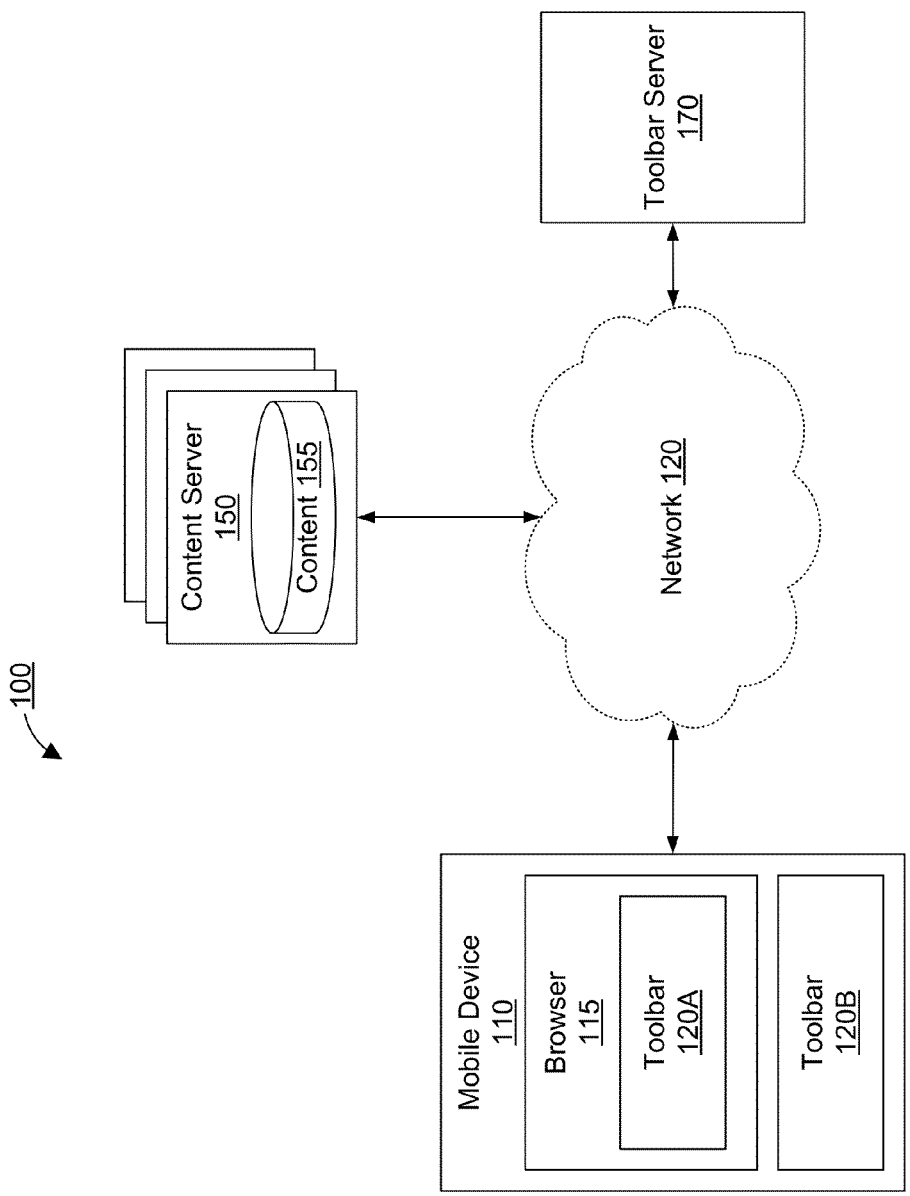
FIG. 1 illustrates a high-level block diagram of an example environment for providing an adaptable toolbar according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A user may view a webpage and the media content therein utilizing a browser or access the media content directly through a separate application. Users often desire to interact with the content they view, by performing actions such as posting the content to a social networking site, liking the content or otherwise sharing the content with other users. Unless the application or content provider provides this functionality natively, the user must navigate a variety of programs to perform the desired action. An adaptable toolbar provided within the application itself or separately that interfaces with the application may be configured to provide the user with this desired functionality. Additionally, the adaptable toolbar may be utilized by carriers to brand the mobile devices used on their network without requiring heavy modification of application or operating system software.

The adaptable toolbar, or toolbar, may be integrated within an application or provided as a standalone component that interfaces with an existing application. The toolbar detects events corresponding to the application and generates a toolbar display corresponding to the event. For example, on loading of a particular webpage in a browser, the toolbar may generate a toolbar display comprising a set of functions to be made available to the user tailored to that webpage. The toolbar may generate different displays for different webpages and different events. For example, the toolbar may generate different displays for a page load event and a tab change event. Additionally, when provided as a standalone component, the toolbar may generate different displays for different applications.

The toolbar is maintained for and associated with the user across the variety of content viewed through the application and, accordingly, may provide persistent functionality to the user. For example, the user may utilize the toolbar while authenticated with a social networking site to share viewed content or view other users' interactions with the viewed content. In another example, a carrier may utilize the toolbar to target specific content directly to the specific user of the mobile device.

The toolbar may generate the display on top of the application and make its background transparent to appear as if it is a part of the application itself. In an embodiment, the toolbar stores toolbar configuration code corresponding to the application which describes the operation of the toolbar within the application. Extension code corresponding to the set of functions may be retrieved and modified locally and/or remotely. The functions themselves are loosely coupled to the toolbar, which allows for their use across different toolbar applications and their ability to be updated without modifying the toolbar or application. In some embodiments, a toolbar server may drive all or a portion of toolbar functionality through provided configuration files. The configuration file may be specific to the application and/or content viewed at the mobile device and optionally modified by the user to personalize toolbar functionality. In such cases, toolbar functionality may be controlled and modified through the configuration file at the toolbar server such that the application and/or toolbar itself need not be updated.

In one embodiment, the toolbar generates a display for presenting and configuring one or more functions a user may perform with the toolbar. A function provided within the toolbar may be realized through the loading of one or more extensions in available packages and plugins. For example, the toolbar may display a set of extensions at the bottom of the screen in scrollable fashion. The toolbar may also be configured to download, create and manage the extensions and the associated plugin through extension configuration code (e.g., extensible markup language "XML") retrieved from a toolbar server. In one embodiment, at the time of extension creation to provide the user with toolbar functionality, the toolbar loads a plugin associated with the extension from a plugin directory, which contains the implementation instructions for that extension.

Extensions may be installed to the toolbar and loaded in the toolbar in response to an event corresponding to their display in the toolbar. The toolbar may specify which extensions to load in the toolbar in response to an event or transmit event information to the toolbar server and receive the set of extensions. In turn, the toolbar generates the toolbar display to provide the user with extended browser functionality. In one example embodiment, the toolbar is implemented with one or more libraries or software development kits "SDKs" that may be linked at compile time with a launched application. The extensions may be retrieved from a server as a form of extended markup language (XML) downloaded and managed by the toolbar. In one example embodiment, the toolbar may load web or JAVASCRIPT (or script) extensions that are compiled by the application (e.g., a browser) and linked as a part of toolbar. Alternatively, the toolbar may comprise functionality to compile web and JAVASCRIPT extensions.

In some cases, mobile devices may have limitations to install packages from a regulated marketplace only. In some embodiments, the toolbar may load local or native extensions that are compiled separately as a package and used by the toolbar without any requirement to install the extension on the mobile device.

Mobile Toolbar Environment

Referring now to FIG. 1, it illustrates a high-level block diagram of an example environment 100 for providing an adaptable toolbar 120 to a mobile device 110 according to one embodiment. As shown, the environment 100 comprises a user device 110, a toolbar server 170, and content server 150. The network 120 is a communication network that transmits data between the mobile device 110, the toolbar server 170 and/or the content server 150. In one embodiment the network 120 includes carrier-based wireless network communication infrastructure such as 2G/3G/4G/etc. and the Internet.

The content server 150 is a computer server that provides stored content 155 to the mobile device 110 via the network 120. For example, when a mobile device 110 requests to retrieve web content corresponding to a website using a browser 115, the content server 150 may receive the request and transmit stored the text, video and/or image content 155 to the mobile device 110. Additionally, the content server 150 may store content 155 targeted to the user of the mobile device 110. For example, the user may perform an activity on the mobile device 110 such as browsing to a particular webpage and a toolbar 120 on the mobile device may, in turn, request targeted content 155 to display to the user.

In one embodiment targeted content 155 is an advertisement selected based on an identity of the user associated with the toolbar. In another embodiment, targeted content 155 is web content associated with the user, such as through the interactions of other users in a social network the user participates in. In another embodiment, targeted content 155 is optimized video content (e.g., an optimized version of video content in the webpage) provided to the user through the toolbar 120. Optimization of video content is explained in more detail in U.S. application Ser. No. 13/945,747, which is incorporated by reference herein. Accordingly, in some embodiments there may be multiple content servers (not shown) for delivering a variety of different content to the mobile device 110.

The toolbar server 170 provides configuration information to the toolbar 120. For example, the toolbar server 170 may receive a query from a toolbar 120 for configuration information in response to the launch of an application such as browser 115. The query may contain information about the state of the browser 115 or application utilizing the toolbar 120 and any mobile device 110 or user specific information. In turn, the toolbar server 170 may transmit an extension XML configuration file(s) specifying extensions and any associated plugin packages that should be loaded by the toolbar 120 to provide functionality for the user. If the mobile device 110 does not have a specified plugin package, the toolbar server 170 may provide executable code and/or packages including one or more plugins to the mobile device 110 that may be loaded in the toolbar 120 to provide toolbar functionality. Alternatively, the content server 150 may provide executable code and/or packages including one or more plugins specified in the extension XML configuration file.

In one embodiment, the extension XML code describes the state and configuration of an extension for display in the toolbar 120. The toolbar server 170 may store configurations for different displays and transmit the extension XML files describing each configuration to the mobile device 110. In turn, the mobile device 110 may access a particular extension XML to configure the display of the toolbar on the mobile device. Example extension configuration parameters may include:

Extension ID: Identification of extension to load in toolbar.
Class Name: Identifies the expected implementation of the extension within a plugin package.
Position: Display configuration for extension in toolbar.
Type of the extension content and corresponding location: Specifies whether an extension comprises local, HTML, or JAVASCRIPT code and identifies the location of the content.
Is enabled flag: Specifies whether an extension is enabled.
Plugin Name: Specifies plugins to load in support of an extension.
Plugin Location: Specifies location of plugin on mobile device or at toolbar server.
Plugin Version: Specifies current version of plugin to load.
Target SDK/Toolbar Version: Compatible version of Toolbar/interface with application.
Icon Location: URL or local location of icon for display in toolbar for an extension.

Can disabledflag: Specifies whether the user may disable an extension.

Can move flag: Specifies whether the extension may be repositioned by the user within the toolbar display.

Can display ad flag: Indicates whether an ad may be displayed with extension.

Signature: Identifies the version of the extension to be loaded.

The toolbar server 170 may alter stored configurations for different displays by modifying the extension XML code provided to the mobile device 110. When a change is made to an extension, the toolbar server 170 updates the signature. The toolbar 120 or toolbar server 170 identifies whether the signature of a stored extension's XML file on the mobile device 110 does not match that of the current version of the extension stored on the toolbar server 170. In turn, the toolbar 120 may request an updated version of the extension XML file or the toolbar server 170 may push the updated version of the extension XML file to the toolbar.

In one embodiment, the mobile device 110 is a computing device with network capabilities. Oftentimes, for example, the mobile device 110 is a wireless enabled mobile computing device with applications such as a web browser 115 and media display capability. Mobile computing devices 110 may include laptops, netbooks, tablets, smart telephones, or personal digital assistants (PDAs). Most often, however the mobile computing device 110 is a tablet, smart phone, or PDA that includes carrier-based wireless network communications capabilities provided by a carrier (not shown). The carrier manages portions of the network 120 that provide wireless services to the mobile devices 110. These devices 110 may additionally couple to the network 120 through WiFi or other wireless communications technologies.

While only one mobile device 110 is illustrated in FIG. 1, the environment 100 may include thousands or millions of such devices. The browser 115 and other applications (not shown) may be software applications running on mobile devices 110 for retrieving web content 155 from content servers 150 and presenting the web content 155 on a display of the mobile device. Multimedia web content 155 accessed by the mobile devices 110 may include text, images, audio and video content. The multimedia content 155 can be played back by the browser 115, for example, in HTML5 compatible browsers, a media container format capable player or a standalone media player. Applications other than the browser 115 may display content 155 in a similar fashion. In one embodiment, the browser 115 may invoke a media container format player available to the browser or the standalone player on the user devices 110 and pass images, audio and/or video for playback. For example, the browser 115 may invoke an integrated 120A or standalone 120B toolbar capable of playing content in a particular container format.

In one embodiment, a toolbar 120A is provided as a component of the browser 115 or other application (not shown). In another embodiment, a toolbar 120B is provided as a standalone component of the mobile device 110 that interfaces with the browser 115 and/or other applications (not shown). In either instance, the toolbar (generally 120) monitors activity of the browser 115 (or other application) to detect events such as when the application is initially launched and determines whether the toolbar interface should be displayed. In turn, the toolbar 120 generates the toolbar interface based on a configuration file corresponding to the event. The toolbar 120 may retrieve the corresponding configuration file from a local storage or query the toolbar server 170 to receive the configuration.

In the former instance, the toolbar 120 may retrieve a local configuration file specifying a set of functions the user desires within the toolbar display. The user may alter the configuration to include more or less functions, change position of an icon corresponding to a function, and adjust display preferences for a function when selecting an icon within the toolbar. Additionally, the user may specify for which events in the application the toolbar 120 should generate the toolbar display.

In the latter instance, the toolbar server 170 may be used to drive aspects of user experience within the application in real-time. For example, the toolbar server 170 may push a configuration to the toolbar 120 that causes the toolbar to display one or more advertisements and track user interactions within the advertisements or provide a specific set of functions within the toolbar 120 instead of, or in addition to, those specified by the user for a specific event. For example, the toolbar server 170 may push a specific configuration to the toolbar 120 based on the content 155 viewed within the application and/or the event detected by the toolbar 120. In some embodiments, the toolbar server 170 may store user preferences corresponding to the set of functions the user desires within the toolbar display and transmit the configuration to the toolbar 120 rather than the toolbar 120 storing a local copy. Thus, the toolbar server 170 may control user experience within the application at all times through the toolbar 120. The toolbar 120 is discussed in greater detail with reference to FIG. 3.

The content server 150 and toolbar server 170 are typically formed of one or more computer servers, which may include components and functionality described in more detail with reference to FIG. 2. While only one server of each content server 150 and toolbar server 170 is shown in the environment 100 of FIG. 1, different embodiments may include multiple servers operated by a single entity or multiple entities. In other embodiments, a single server may also provide different functionalities, such as delivering web content as a web server, as well as serving toolbar extensions. Mobile devices 110 may also include components and functionality similar to those described in FIG. 2.

Computing Machine Architecture

Figure 2:
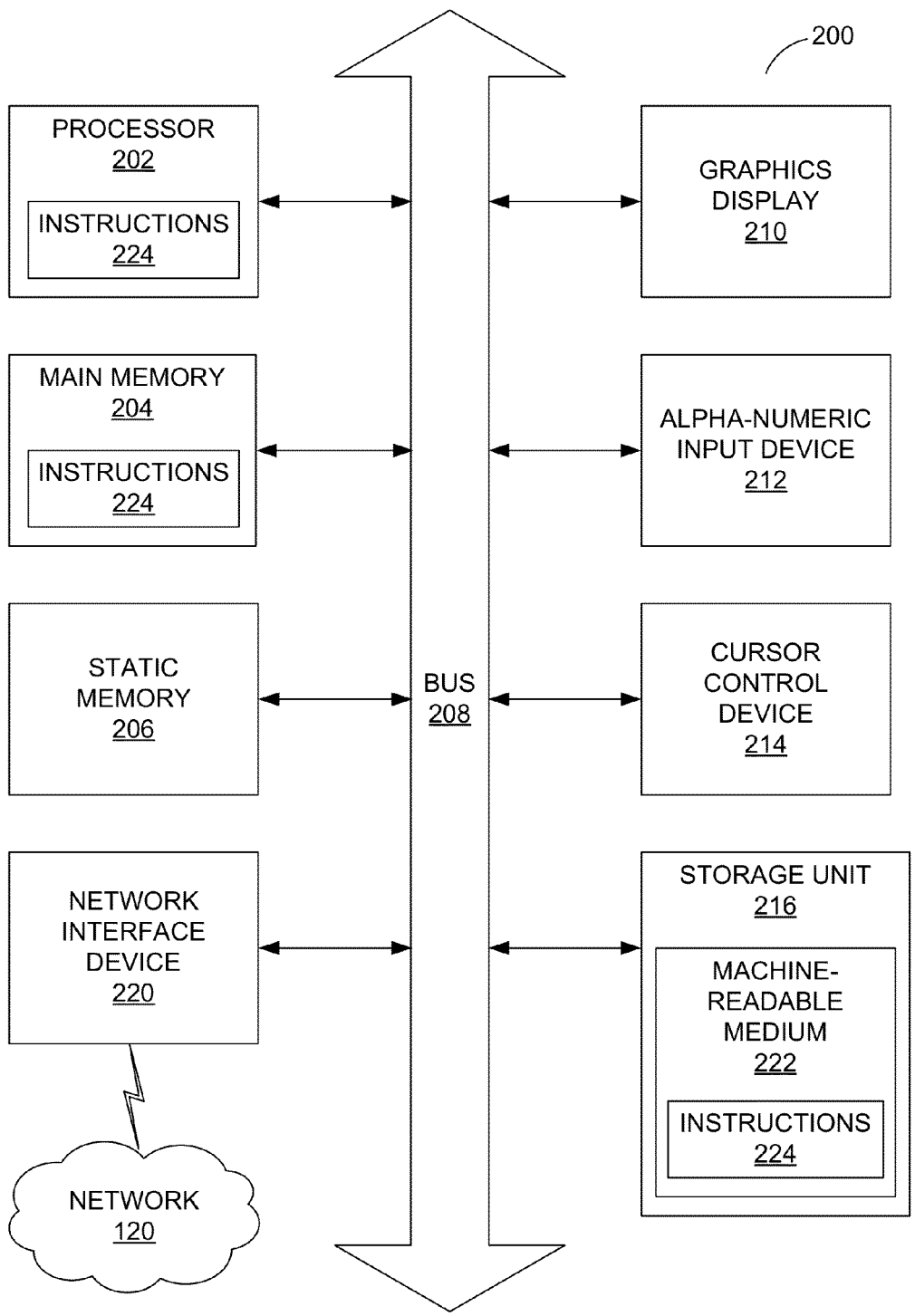
FIG. 2 illustrates an embodiment of components of an example machine able to read instructions from a machine-readable medium and execute them in a process or controller.

Turning now to FIG. 2, it is a block diagram illustrating components of an example machine able to read instructions from a machine-readable medium and execute them in a processor (or controller) to implement the disclosed system for on-demand real-time network monitoring and subscriber identification. Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 120 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Toolbar Architecture

Figure 3:
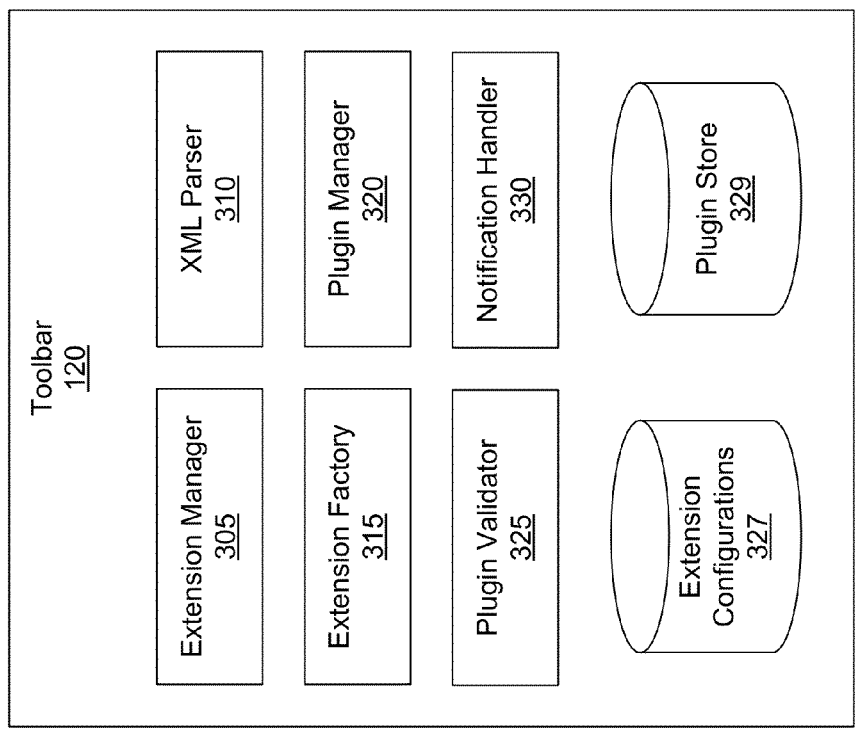
FIG. 3 illustrates an embodiment of a toolbar for targeting a user with content on a mobile device.

FIG. 3 illustrates an embodiment of a toolbar 120 for targeting a user with content on a mobile device 110. Toolbar 120A and 120B illustrated in FIG. 1 may comprise components similar to those illustrated in FIG. 3. As shown, the toolbar 120 may include a number a modules including an extension manager 305, XML parser 310, extension factory 315, plugin manager, plugin validator 325, and notification handler 330. The toolbar 120 may further include an extension configuration store 327 and a plugin store 329.

The extension manager 305 loads and stores extension configurations in response to events detected at an application by the notification handler 330. For example, the extension manager 305 may load a number of extensions in response to the launch of a browser on a mobile device. The extension manager 305 may load extensions from the extension configuration store 327 and/or query a toolbar server to receive extension configuration information.

In one embodiment, the extension manager 305 queries the toolbar server for a configuration file and the toolbar server 170 specifies the state and configuration of the extensions that should be loaded in the toolbar 120. In turn, only extensions that are specified in the configuration file from the server may be loaded from the configuration stores 327 in the toolbar 120. Extensions not available in the configuration store 327 may be requested from the toolbar server as extension configuration code.

The extension manager 305 may initially load a global configuration that provides background functionality within the toolbar 120. For example, the global configuration may specify whether advertisements are enabled for loaded extension, track user activity within extension for analytics (e.g., reporting of user interaction with an advertisement), and specify any of the plugins corresponding to those functions. Additionally, the global configuration may specify events in which the toolbar 120 should show, hide, or close itself and for which events the extension manager 305 should query the toolbar server to specify a configuration of the toolbar and/or retrieve extension configuration files. Extensions loaded subsequent to the global configuration may be destroyed as needed within the toolbar 120.

In one embodiment, the extension configuration file is an XML file and received at XML parser 310. The XML parser 310 creates extension configuration object code from the received extension configuration XML code. For example, the XML configuration code may specify a type of the extension content and corresponding location as described above. Local code may be native to the toolbar 120 and/or mobile device 110 while HTML or JAVASCRIPT code may be retrieved from the specified location in the XML file and stored in the extension configuration store 327.

In one embodiment, the extension manager 305 compares parsed extension configuration object code against the local extension object code stored in the configuration store 327 and determines whether to update an extension, add the code (e.g., as a new extension), or discard the code. In one embodiment, the extension manager 305 preserves user customizations to extensions locally. For that purpose, the extension manager 305 may keep track of a signature of the extension object code itself (e.g., the local, HTML or JAVASCRIPT code of the extension) and updates the signature when changes are made within the extension to determine whether updated object code should be retrieved.

The extension factory 315 creates extension objects that may be executed for display within the toolbar 120 interface from corresponding configuration code and plugins specified in the configuration code. In turn, the extension factory 315 may receive instructions from the notification handler 330 to display, hide, or otherwise alter the configuration of the toolbar 120 on the display of the mobile device 110 to present extension functionality to the user. In one embodiment, the extension factory 315 generates a toolbar interface for displaying one or more extensions and corresponding plugin functionality to the user. For example, the toolbar interface may display a set of extensions at the bottom of the display of the mobile device 110 in scrollable fashion. The user may configure an extension by providing login information, such as for a social networking site, indicating preferences for when to display an extension, or whether to display the toolbar 120 at all. The extension factory 315 may execute a given extension for display to perform the corresponding functionality in response to a selection from the user or automatically in response to instructions in the configuration file and/or an event (e.g., to display automatically on page load, every fifth page load, or every five minutes). Executing the given extension for display may comprise, for example, sharing a content item or sharing the webpage on a social network (or providing a plugin to perform the function), retrieving content targeted to the user based on the webpage being viewed by the user, and retrieving optimized content related to the webpage among other functions.

In one embodiment, the extension factory 315 receives loaded configuration code from the extension manager 305, retrieves corresponding plugins specified in the configuration code from the plugin manager 320 and, in turn, creates the extension object wrapping the implementation of the plugin. For example, as shown in FIG. 5A the toolbar 120 has an Extension.java class 505 defined within the toolbar, which may be the super class of all extensions. A plugin package 501A may contain plugins 507, 509 containing one or more the implementations of Extension.java 505, which could be classes that extend Extension.java to provide a video playback or content sharing through a social network. For example, the ShareExtension 509 may extend the toolbar 120 extension class 505, where ShareExtension is defined in the plugin package 501A and extension class 505 is defined in the toolbar.

Turning back to FIG. 3, the plugin manager 320 manages plugin packages for extensions. Based on the plugins specified in extension configuration, it may load plugins from the plugin store 329. If a plugin specified in an extension configuration is not available in the plugin store 329, the plugin manager 320 may download the plugin (e.g., at a location specified in the configuration code) from a server such as the toolbar server 170 or content server 150 to the local store 329.

The plugin validator 325 verifies the version and optionally a signature of the plugin with that specified in the configuration file for the extension. Plugins failing verification may be redownloaded from a server. If a plugin is not verified, the extension factory 315 will not create extension objects dependent on the plugin.

Figure 5B:
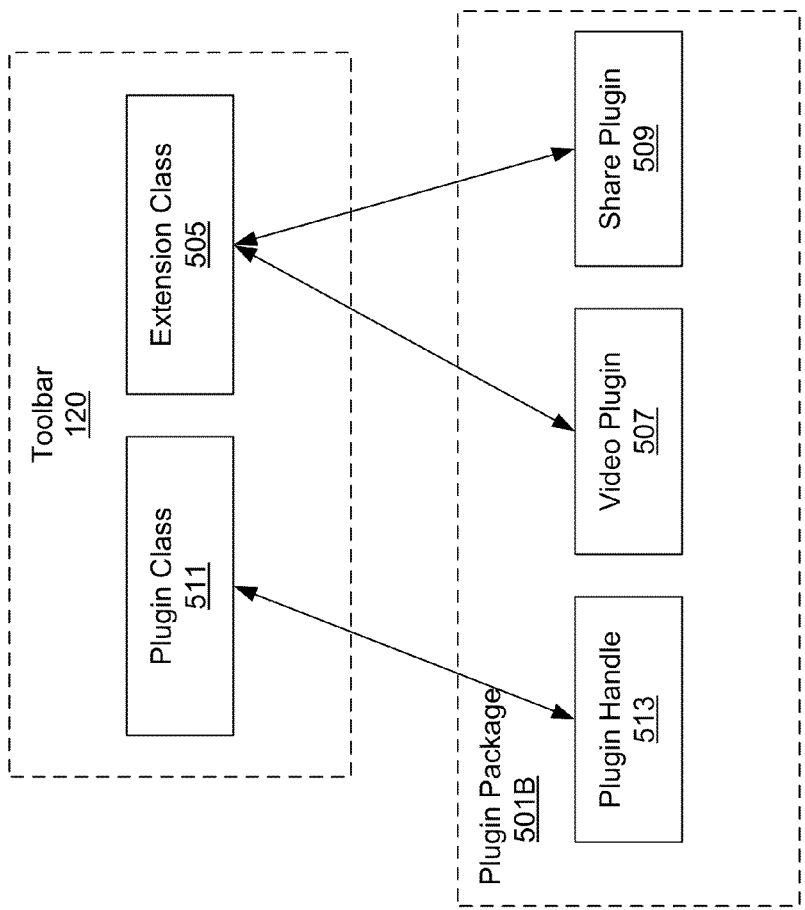
FIGS. 5A and 5B are high-level block diagrams illustrating embodiments of architectures for managing extensions and plugins within the toolbar.
Figure 5A:
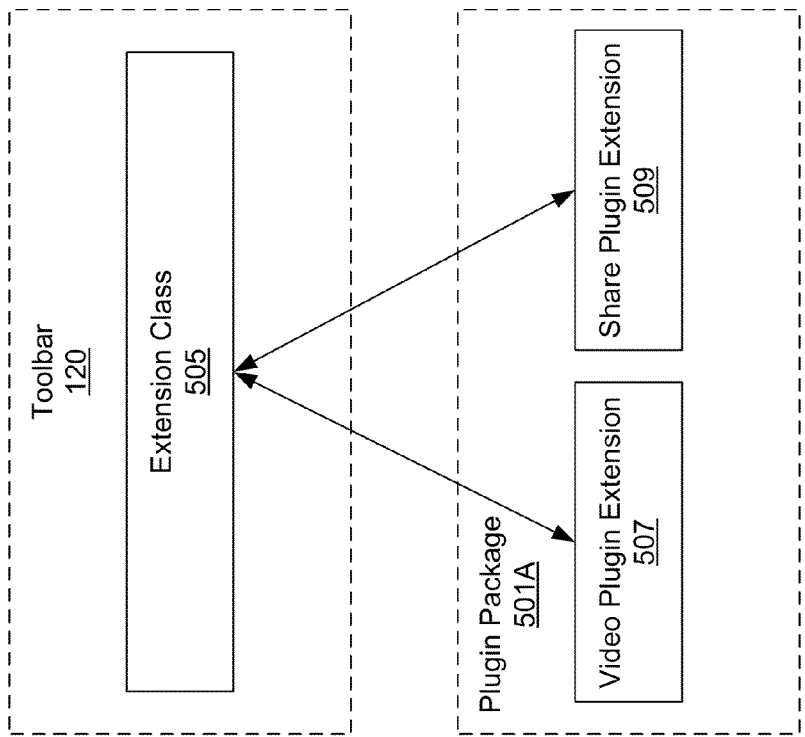

For example, FIG. 5B illustrates a plugin package 501B that includes a plugin handle 513 and plugins 505, 509 that extend plugin class 511 and extension class 505, respectively, within the toolbar 120. In an example implementation, the plugin handle 513 may have the implementation of the class Plugin.java 511 within the toolbar 120. In one embodiment, the plugin class 511 within the toolbar 120 may be used for life cycle management of the plugin. Because plugin handle 513 in the plugin package 501B extends plugin class 511 in toolbar 120, the toolbar 120 may utilize life cycle methods defined within the plugin class 511 such as pluginLoaded( ), pluginPaused( ), pluginResumed( ) and pluginDestroyed( ) in instances of plugins within the plugin package 510B. Other methods defined within the toolbar 120 may similarly be extended to plugins in the plugin package 501B. As such, the extension objects created by the extension factory 315 wrap the configuration and implementation of the plugins, which may be retrieved and loaded separately from the extension objects. Accordingly, the plugins themselves may be updated and handled separately from the extension objects by the plugin manager 320. This configuration beneficially enables a first party, such as a carrier operating a toolbar server 170, to incorporate 3$^{rd}$ party plugin functionality but only as defined within the configuration files transmitted to the toolbar 120 and without having to integrate the code directly into the toolbar or even an extension relying on the plugin.

The notification handler 330 handles events corresponding to the use of an application. For example, the notification handler 330 may interface with an application to identify events such as application startup, application idle (e.g., in background), application active (e.g., in foreground), application close, etc., and any application specific event. In a specific example for a browser 115, the notification handler 330 may further identify events such webpage load, tab change, tab close, tab open, etc. Other applications may feature different events, such as loss, pause or win of a game, or selection within the application itself. The notification handler 330 pass the events to the extension factory 315 which may act on the event by displaying a configuration of the toolbar 120 corresponding to the event.

In the case of a toolbar 120 integrated with a browser 115, such as toolbar 120A illustrated in FIG. 1, the notification handler 330 may interface directly with the browser 115 to receive notifications and information about content being displayed by the browser, tab changes, etc. Toolbars such as toolbar 120A that are integrated with other applications may be configured in a similar manner to monitor status of the application directly and/or receive information about the application to identify events.

Figure 4:
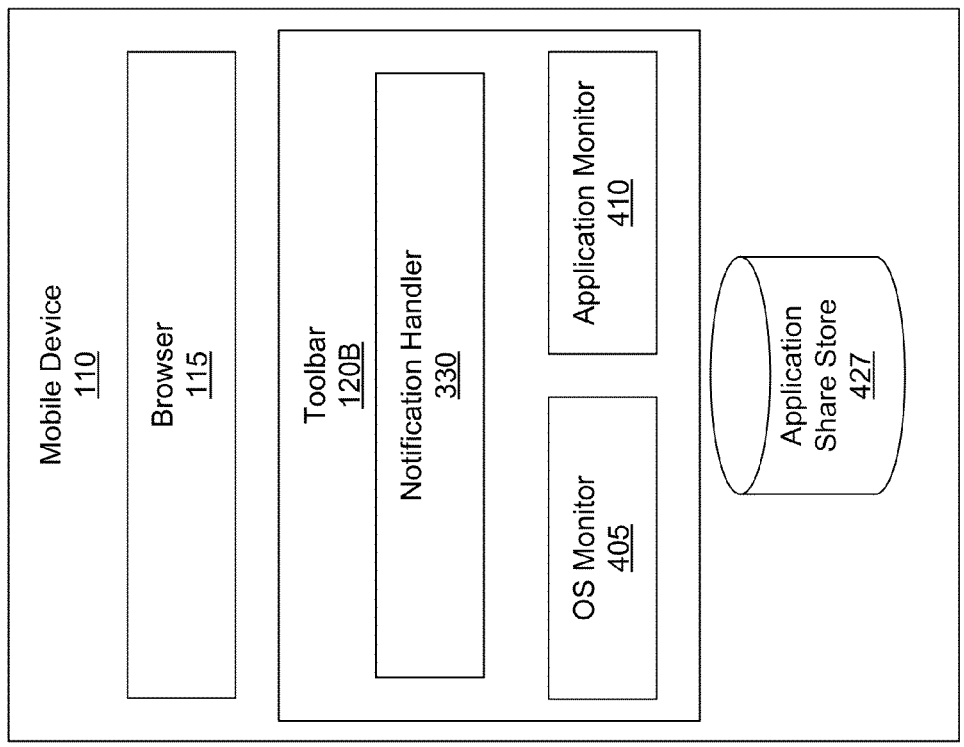
FIG. 4 illustrates an embodiment of a toolbar external to a browser for targeting a user with content on a mobile device.

Turning now to FIG. 4, it illustrates an embodiment of a toolbar 120B external to a browser 115 for targeting a user with content on an example mobile device 110. As shown, toolbar 120B is provided as a standalone application on the mobile device 110. In such cases, the toolbar 120B may include and/or interface with components additional to those illustrated in FIG. 3. The toolbar 120B may be installed to the mobile device 110 without modifying any browser 115 or application specific code or configuration. Once installed, the toolbar 120B runs in background and detects application events, which are then passed to the notification handler 330 for processing. For example, when an application is launched on screen, the toolbar 120 may generate a toolbar interface overlaying the application at bottom of the screen and wait for user events within the toolbar 120 and/or detected events within the application. In another example, the toolbar 120 may detect browser 115 webpage loads and tab change events that are passed to the notification center 330 such that the standalone toolbar 120B configuration may be altered in a similar manner to the integrated toolbar 120A, e.g., reacting to the event by modifying its configuration to display contextual extension functions corresponding to the content present in the webpage loaded within the application or based on the event.

As shown, the standalone toolbar may include an operating system (OS) monitor 405 and application monitor 410 in addition to the notification center 330. In the embodiment shown, they are illustrated within the toolbar 120B but alternately may be installed separately to the mobile device 110. It is noted that the operating system (OS) may be any operating system, for example, APPLE iOS, GOOGLE ANDROID, RESEARCH IN MOTION BLACKBERRY OS or MICROSOFT WINDOWS MOBILE.

The OS monitor 405 detects events within the framework of the operating system of the mobile device 110 that are incurred through changes in the application. In one embodiment, the OS monitor 405 detects the interaction the system has with the application. In a specific embodiment, the OS monitor 405 may detect events through application specific frameworks, such as a browser instrumentation service, which the operating system (OS) evokes when browsers on the mobile device 110 are launched. Upon invocation, the instrumentation service interfaces with the browser 115 to register for events such as a tab change notification. Thus, whenever a tab change occurs within the browser 115, the OS monitor 405 in turn detects the event and passes the event information (e.g., URL of the displayed tab) to the notification handler 330 for processing.

Application monitor 410 is a background service that monitors which application is actively in the foreground on the mobile device 110 and the content being loaded within the application to detect events such as webpage loads within a browser 115 tab. In a specific example, an application may share a portion of its data with other applications in an application share store 427. The application monitor 410 detects when the underlying data in the application share store 417 shared through the application is changed. In the case of a browser 115, accessed URLs loaded within the browser (e.g., browsing history data) are shared. The application monitor 410 detects the change in shared URLs to identify a page load event and passes event information (e.g., newly/most recent shared URL of the loaded page) to the notification handler 330. In turn, the toolbar 120B may modify the interface based on contextual information associated with the event.

The application monitor 410 further identifies which application is displayed in the foreground and passes event information identifying the application to the notification handler 330. Thus, the toolbar 120B may determine whether to hide, show, or modify the toolbar display based on the application and application status.

Toolbar Operation

Figure 6:
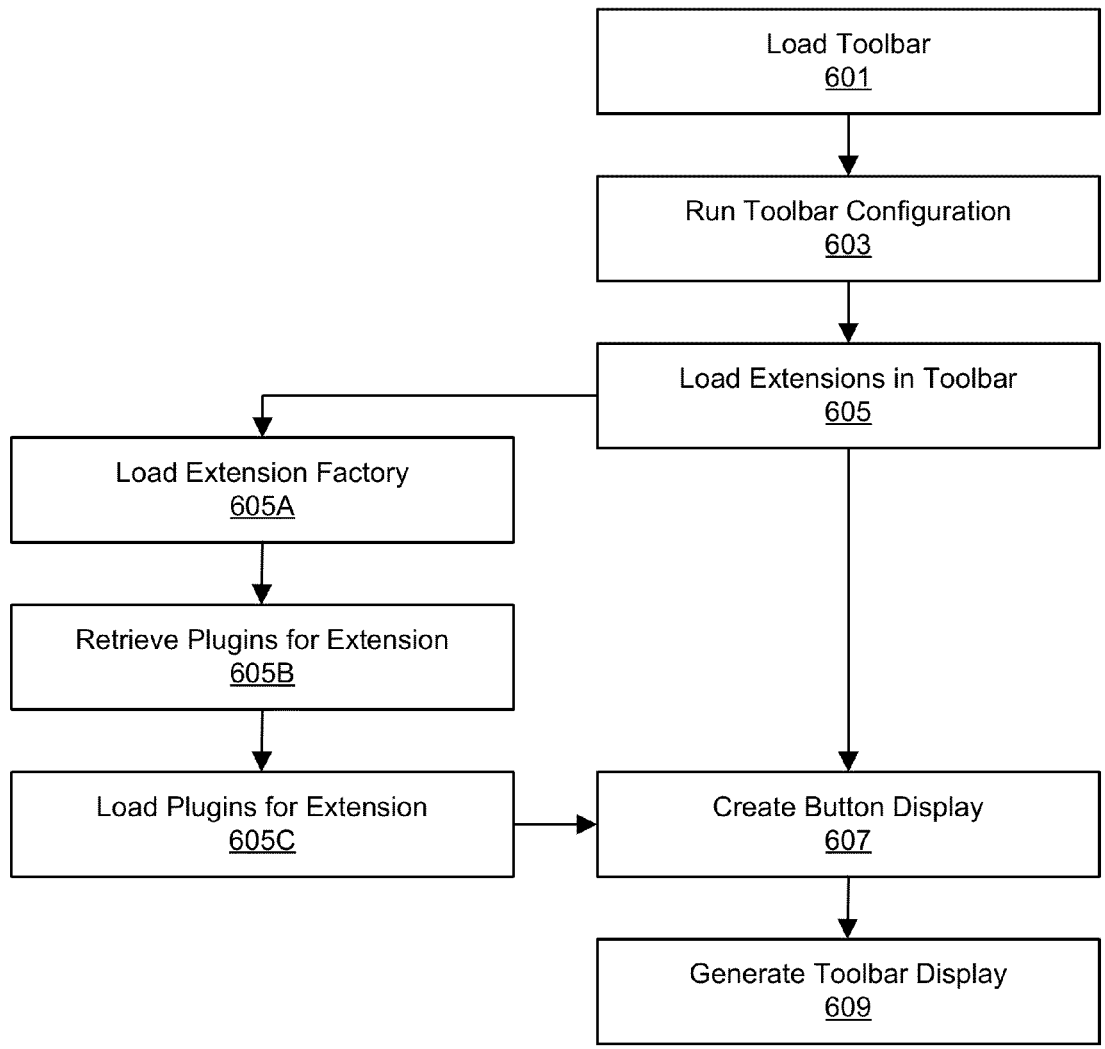
FIG. 6 illustrates a flow diagram of an embodiment for generating a toolbar display on a mobile device.

FIG. 6 illustrates a flow diagram of an embodiment for generating a toolbar display on a mobile device 110. When an event associated with an application in which the toolbar display should be generated is detected, the toolbar is loaded 601. For example, the toolbar may be loaded 601 when the launch of an application or when the application visibly appearing on the screen is detected. In one embodiment, the application launch and display events are detected through an OS monitor. In other embodiments, the toolbar may interface with the application to load 601 in response to the events.

Once loaded, the toolbar may run 603 a global toolbar configuration that defines the actions the toolbar should take in response to different detected events in the application and on screen location where the toolbar display should be generated. The global toolbar configuration may also specify a number of global plugins for providing advertisements and analytics that are loaded to support overall functionality of the toolbar across all extensions.

Based on the detected event, for example as specified in the global toolbar configuration, the toolbar determines one or more extensions to load 605 in the toolbar to extend browser functionality. In some embodiments, the toolbar transmit event information to a toolbar server in a query and receive configuration code corresponding to one or more extensions to be included in the toolbar display. Thus, the toolbar server may drive the visual and user experience of the toolbar on the mobile device. The toolbar server may also transmit updated global toolbar configuration code or extension configuration code to the toolbar if a signature corresponding to the stored code does not match a current version on the server.

In some embodiments, the toolbar loads 605A an extension factory for creating extension objects from extension configuration files. The extension configuration files may identify one or more plugins that support the functionality of the extension objects. The specified plugins are retrieved 605B and loaded 605C for each extension. Plugins may be validated with their source to ensure functionality of the extension object created by the extension factory.

The configuration code for the extensions to be loaded 605 specifies their function, position, and an icon for display within the toolbar. A button comprising the icon identifying each extension is created 607 and positioned relative to the other buttons based on the position date in the extension configuration code.

The toolbar then generates 609 the toolbar display showing the icons overlaying the application. Once displayed, the toolbar may detect user activity within the toolbar, such as selection of an icon, to display and/or perform extension functionality.

FIGS. 7A and 7B illustrate example toolbar displays generated on a mobile device 110. As described above, a toolbar 120 for generating the toolbar display 700 may be incorporated into a browser 115 or other application running on the mobile device 110 or provided as a standalone component. The toolbar 120 may provide additional functionality above and beyond the basic features of the browser 115. The existing browser 115 may continue to operate normally, but with an additional set of toolbar functions provided on the bottom of the screen.

As shown in FIGS. 7A and 7B, the toolbar display 700 may overlay the browser at the bottom portion of the screen. Other toolbar display 700 locations may include the top or side of the screen. The toolbar display 700 shows a number of icons 705 that may be selected by the user to display extension content such as one or more plugins or perform a function directly.

FIG. 7A illustrates an example selection 705A of a like or share icon within the toolbar 700. In response to the selection, the toolbar 120 displays extension content 710, which may comprise one or more plugins 703, 705. The share plugin 703 may be used to post or share the content viewed in the browser (e.g., via the URL) through a social network, via email, or other communication method. The like plugin 705 may be used to "like," "thumbs-up," "+1," or otherwise similarly indicate approval of the viewed content through a $3^{rd}$ party social networking site. As the underlying content within the browser 115 changes, the plugins 703, 705 perform their operations for the newly browsed to content.

FIG. 7B illustrates an example selection 705B of a popular icon within the toolbar 700. In response to the selection, the toolbar 120 displays extension content 710, which may comprise interfacing with a content server 150 to retrieve social networking content 155 associated with the user registered with the toolbar 120. The retrieved social networking content 155 indicates content associated with the current webpage that one or more social networking connections of the user have interacted with. Additionally, the social network content 115 may indicate an overall popularity of content associated with the current webpage on the social network.

Additional Configuration Considerations

The disclosed configurations beneficially allow a carrier or other party to dynamically manage and configure a toolbar at a mobile device to control user experience within an application such as a browser. The carrier may specify the configuration and actions of the toolbar in response to events within the application and further which extensions expanding the functionality of the application are displayed within the toolbar for different events. Uniquely, the extensions appearing within the toolbar may be configured in real-time through configuration files transmitted to the toolbar. Because the extensions and plugins the extensions wrap around are loaded when needed and need not be configured within the application or toolbar itself, provided toolbar functionality may be changed separately from application and/or toolbar development cycle. In the case of the standalone toolbar, the carrier may not need to alter or install the toolbar to any application code (e.g., incorporating the toolbar within the application). Thus, the application may be updated separately from the toolbar.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as shown in FIGS. 1, 3, 4, and 5A, 5B. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIG. 6) described herein may be performed, at least partially, by one or more processors (e.g., processor 202) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 204). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for providing an adaptable toolbar for targeting advertisements and providing user functionality on a mobile device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a toolbar display on a mobile device overlaying an application comprising:

detecting through a toolbar executing on the mobile device, a first event corresponding to the application visibly appearing on the screen;

loading, through the toolbar in response to detecting the first event corresponding to the application visibly appearing on the screen, a toolbar configuration defining at least one period to generate the toolbar display responsive to a second event corresponding to a user activity within the application;

detecting on the mobile device, through the toolbar, the second event corresponding to the user activity within the application;

transmitting, through the toolbar in response to detecting the second event corresponding to the user activity within the application, information describing the second event;

receiving, through the toolbar, an extension configuration specific to the second detected event and specifying a set of extensions to provide in the toolbar display, each extension having a corresponding function, icon, and display area for the icon within the toolbar display;

creating, through the toolbar for an extension in the set, a button at the corresponding display area within the toolbar display; and generating, through the toolbar, the toolbar display on the mobile device overlaying the application and detecting through the toolbar a user activity within the toolbar display.

2. The method of claim 1, wherein the first event corresponds to the launching of the application on the mobile device.

3. The method of claim 1, wherein loading the toolbar configuration through the toolbar comprises receiving toolbar configuration code from a server, the toolbar configuration code specifying one or more global plugins for at least one of providing advertisements within the toolbar display and tracking user activity within the toolbar display.

4. The method of claim 3, wherein tracking user activity within the toolbar display comprises transmitting information corresponding to the interactions of the user to the server.

5. The method of claim 1, wherein the information describing the second event is transmitted through the toolbar to a server and receiving the extension configuration specifying the set of extensions through the toolbar further comprises:

parsing extension configuration information received from the server and comparing a signature of the parsed extension configuration with a signature of a same extension on the mobile device; and retrieving, in response to determining a difference between the signatures, new extension object code for the same extension, the new extension object code loaded to provide extension functionality on the mobile device through the toolbar.

6. The method of claim 5, wherein the extension object code is HTML or script code retrieved from a location specified in the extension configuration information.

7. The method of claim 5, wherein the extension configuration information identifies one or more plugins that support the functionality of the extension object code when loaded through the toolbar, the method further comprising:

retrieving a plugin not present on the mobile device; and
validating said plugins to ensure functionality of the extension object code when loaded in the toolbar.

8. The method of claim 1, wherein detecting a user activity within the toolbar display comprises detecting a selection of the button within the toolbar display, and executing the extension corresponding to the button.

9. The method of claim 8, wherein the second event corresponds to a tab change in a browser application or loading of a new webpage in the browser application, the extension retrieving content from a server based on a URL associated with the tab or new webpage loaded in the browser application.

10. A system for generating a toolbar display on a mobile device overlaying an application, comprising:

a processor; and a non-transitory computer-readable storage medium storing a toolbar comprising executable computer program instructions that when executed causes the processor to:

detect on the mobile device a first event corresponding to the application visibly appearing on the screen;

load in response to detection of the first event corresponding to the application visibly appearing on the screen, a toolbar configuration defining at least one period to generate the toolbar display responsive to a second event corresponding to a user activity within the application;

detect on the mobile device the second event corresponding to the user activity within the application;

transmit in response to detecting the second event corresponding to the user activity within the application, information describing the second event;

receive an extension configuration specific to the second detected event and specifying a set of extensions to provide in the toolbar display, each extension having a corresponding function, icon, and display area for the icon within the toolbar display;

create, for an extension in the set, a button at the corresponding display area within the toolbar display; and generate the toolbar display on the mobile device overlaying the application and detecting a user activity within the toolbar display.

11. The system of claim 10, wherein the first event corresponds to the launching of the application on the mobile device.

12. The system of claim 10, wherein loading the toolbar configuration comprises receiving toolbar configuration code from a server, the toolbar configuration code specifying one or more global plugins for at least one of providing advertisements within the toolbar display and tracking user activity within the toolbar display.

13. The system of claim 12, wherein tracking user activity within the toolbar display comprises transmitting information corresponding to the interactions of the user to the server.

14. The system of claim 10, wherein the information describing the second event is transmitted to a server and receiving the extension configuration specifying the set of extensions further comprises:

parsing extension configuration information received from the server and comparing a signature of the parsed extension configuration with a signature of a same extension on the mobile device; and retrieving, in response to determining a difference between the signatures, new extension object code for the same extension, the new extension object code loaded to provide extension functionality on the mobile device.

15. The system of claim 14, wherein the extension object code is HTML or script code retrieved from a location specified in the extension configuration information.

16. The system of claim 14, wherein the extension configuration information identifies one or more plugins that support the functionality of the extension object code when loaded in the toolbar, the system further comprising:

retrieving a plugin not present on the mobile device; and
validating said plugins to ensure functionality of the extension object code when loaded in the toolbar.

17. The system of claim 10, wherein detecting a user activity within the toolbar display comprises detecting a selection of the button within the toolbar display, and executing the extension corresponding to the button.

18. The system of claim 17, wherein the second event corresponds to a tab change in a browser application or loading of a new webpage in the browser application, the extension retrieving content from a server based on a URL associated with the tab or new webpage loaded in the browser application.

19. A non-transitory computer readable storage medium comprising instructions that when executed by a processor cause the processor to:
provide a toolbar module to a mobile device associated with a network, the toolbar module configured to:
detect on the mobile device a first event corresponding to an application visibly appearing on the screen;
load, in response to detection of the first event corresponding to the application visibly appearing on the screen, a toolbar configuration defining at least one period to generate the toolbar display responsive a second event;
detect on the mobile device the second event corresponding to the user activity within the application;
transmit, in response to detecting the second event corresponding to the user activity within the application, information describing the second event;
receive an extension configuration specific to the second detected event and specifying a set of extensions to provide in the toolbar display, each extension having a corresponding function, icon, and display area for the icon within the toolbar display;
create, for an extension in the set, a button at the corresponding display area within the toolbar display; and
generate the toolbar display on the mobile device overlaying the application and detecting a user activity within the toolbar display.

20. The non-transitory computer readable storage medium of claim 19, wherein the first event corresponds to the launching of the application on the mobile device.

21. The non-transitory computer readable storage medium of claim 19, wherein loading the toolbar configuration comprises receiving toolbar configuration code from a server, the toolbar configuration code specifying one or more global plugins for at least one of providing advertisements within the toolbar display and tracking user activity within the toolbar display.

22. The non-transitory computer readable storage medium of claim 21, wherein tracking user activity within the toolbar display comprises transmitting information corresponding to the interactions of the user to the server.

23. The non-transitory computer readable storage medium of claim 19, wherein the information describing the second event is transmitted to a server and receiving the extension configuration specifying the set of extensions further comprises:
parsing extension configuration information received from the server and comparing a signature of the parsed extension configuration with a signature of a same extension on the mobile device; and
retrieving, in response to determining a difference between the signatures, new extension object code for the same extension, the new extension object code loaded to provide extension functionality on the mobile device.

24. The non-transitory computer readable storage medium of claim 19, wherein detecting a user activity within the toolbar display comprises detecting a selection of the button within the toolbar display, and executing the extension corresponding to the button.

25. The non-transitory computer readable storage medium of claim 24, wherein the second event corresponds to a tab change in a browser application or loading of a new webpage in the browser application, the extension retrieving content from a server based on a URL associated with the tab or new webpage loaded in the browser application.

\* \* \* \* \*